United States Patent [19]

Nenezu et al.

[11] Patent Number: 5,079,647
[45] Date of Patent: Jan. 7, 1992

[54] METHOD AND APPARATUS FOR RECORDING/REPRODUCING MONAURAL AUDIO SIGNAL MIXED WITH THE CLOCK AND DATA SIGNALS

[75] Inventors: Yoshiichi Nenezu; Kikuo Wakayama, both of Saitama, Japan

[73] Assignee: Sony Corporation, Tokyo, Japan

[21] Appl. No.: 471,369

[22] Filed: Jan. 29, 1990

[30] Foreign Application Priority Data

Feb. 14, 1989 [JP] Japan .................................. 1-34086

[51] Int. Cl.⁵ ............................................. G11B 5/02
[52] U.S. Cl. ..................................... 360/27; 360/22; 360/18
[58] Field of Search ....................... 360/27, 26, 22, 18, 360/71; 369/48, 49, 86, 91, 92, 174

[56] References Cited

U.S. PATENT DOCUMENTS

| | | | |
|---|---|---|---|
| 3,539,734 | 11/1970 | Tsuchiya | 179/100.2 |
| 3,573,393 | 4/1971 | Blackie et al. | 179/100.2 |
| 4,658,306 | 4/1987 | Daigaku et al. | 360/22 |
| 4,663,678 | 5/1987 | Blum | 360/72.2 |
| 4,692,818 | 9/1987 | Fujibayashi | 360/22 |

FOREIGN PATENT DOCUMENTS

| | | |
|---|---|---|
| 1058366 | 5/1959 | Fed. Rep. of Germany . |
| 2212072 | 7/1974 | France . |
| 2028559 | 3/1980 | United Kingdom . |
| 2029168A | 3/1980 | United Kingdom . |

OTHER PUBLICATIONS

Patent Abstract of Japan, vol. 7, No. 88 (E-170)(1233), 12 Apr. 1983, and JP-A-58 013100 (Hitachi Seisakusho K. K.), 25 Jan. 1983.

*Primary Examiner*—Aristotelis Psitos
*Assistant Examiner*—Varsha V. Sheladia
*Attorney, Agent, or Firm*—Philip M. Shaw, Jr.

[57] ABSTRACT

A recording and/or reproducing method and corresponding apparatus are provided, in which in phase monaural audio signals are separately mixed with a clock signal and a data signal, which are opposite in phase to each other, and the mixed signals are recorded in separate channels on a recording medium. Upon reproduction and recombination of the signals recorded in the two channels, the clock signal and the data signal cancel each other out so that the listener hears only the combined monaural audio signals but the clock signal and the data signal can be separated from the reproduced two channel recorded signals prior to their recombination and be used to generate visual display data concerning the recorded signals.

21 Claims, 3 Drawing Sheets

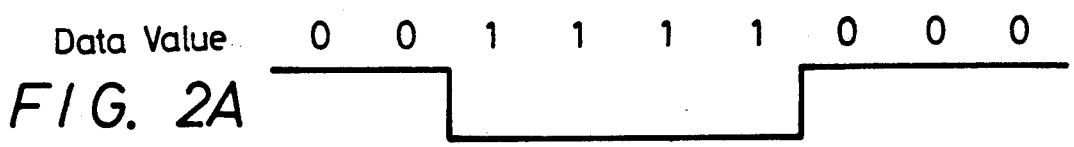

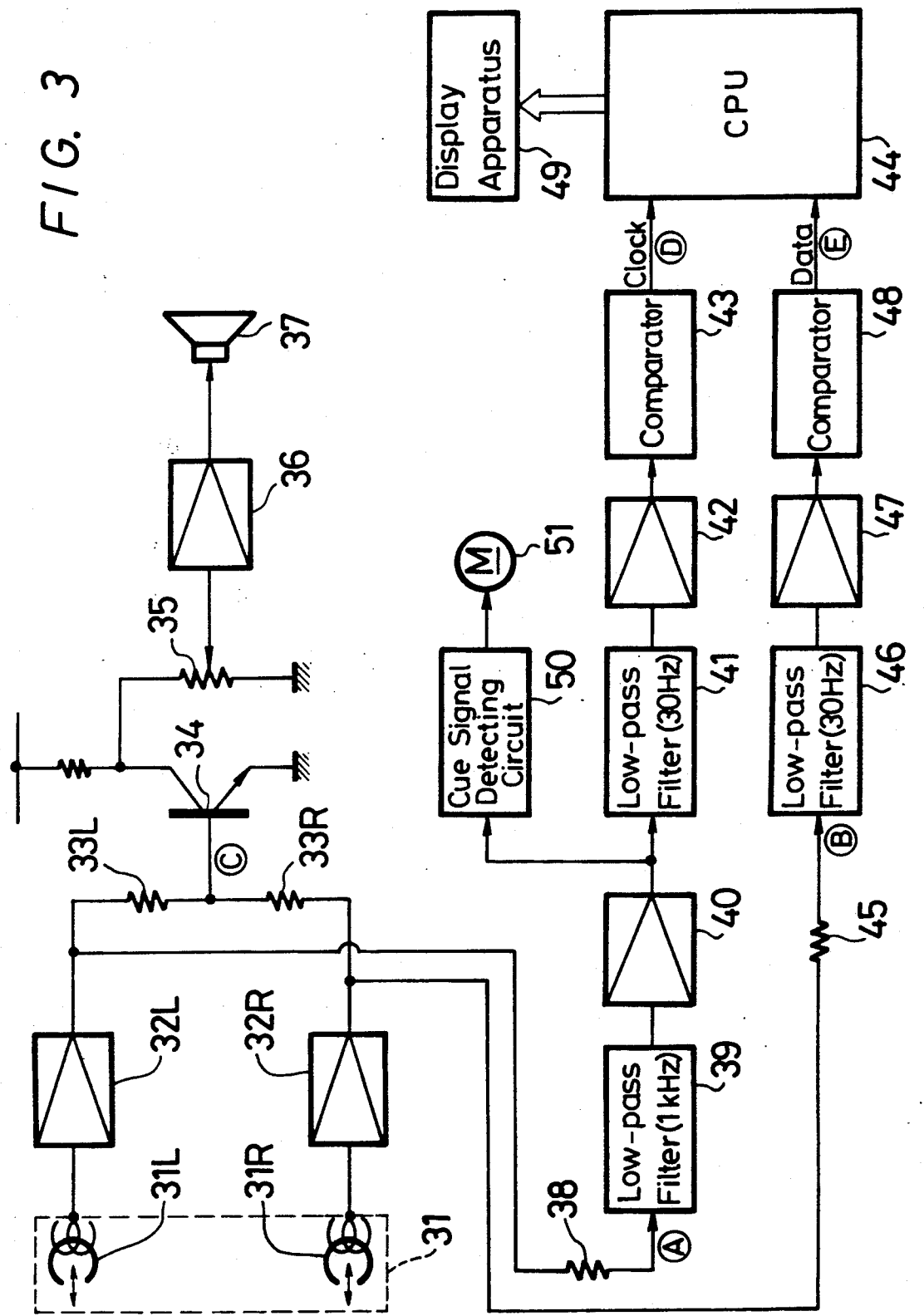

METHOD AND APPARATUS FOR RECORDING/REPRODUCING MONAURAL AUDIO SIGNAL MIXED WITH THE CLOCK AND DATA SIGNALS

BACKGROUND OF THE INVENTION

1. Field of the Invention

The present invention relates generally to a recording and/or reproducing method and particularly relates to a recording and/or reproducing method suitable for application to a tape recorder utilizing a so-called compact cassette.

2. Description of the Prior Art

When an audio signal is recorded on a magnetic tape by, for example, a tape recorder, it is sometimes necessary to record memo data such as the date and place of such recording or the like together with the audio signal. Therefore, in a recording and/or reproducing method utilizing a monaural magnetic head, a magnetic tape is arranged to provide a particular area before and after the area in which the audio signal is recorded, and the above-mentioned data is recorded in such particular areas.

According to this previously-proposed method, upon reproducing, an undesirable sound resulting from such data signal is reproduced before and after the audio signal. Such data sound is the same as noise from an auditory sense standpoint, which is very unpleasant for the listener.

On the other hand, another proposal is made, in which a monaural audio signal is recorded in a first channel and a data signal is recorded in a second channel by using a so-called stereo-head. According to this proposal, by audibly reproducing only the audio signal from the first channel, it is possible to avoid reproducing such an unpleasant sound.

However, when such a two channel recorded magnetic tape is reproduced by a tape recorder utilizing a monaural head instead of a stereo head, the signals in the first and second channels are added and then reproduced, whereby real sound and data sound are reproduced in a mixed state. It becomes very difficult to listen to only the sound of the audio signal. In other words, the aforementioned two channel recording method is not compatible with other tape recorders utilizing a monaural head.

In order to remove these defects, the following proposal is made:

Upon recording, one portion of the band of an audio signal is removed by a filter and a data signal is recorded in the removed band. Also in accordance with this proposal, when the thus recorded magnetic tape is reproduced by another reproducing apparatus, data sound is inevitably mixed into the audio sound. In order to arrange the data sound to have the proper amplitude level and band so that the listener is not perplexed by an unpleasant sound, some special circuit arrangement must be provided to record and/or reproduce the data signal, which makes the apparatus very expensive.

OBJECTS AND SUMMARY OF THE INVENTION

Therefore, it is an object of the present invention to provide an improved recording and/or reproducing method and associated apparatus which can avoid the above-mentioned defects encountered with the prior art.

More specifically, it is an object of the present invention to provide a recording and/or reproducing method and associated apparatus by which unpleasant data sound can be prevented from being emanated together with reproduced sound upon playback.

It is another object of the present invention to provide a recording and/or reproducing method and associated apparatus by which a recording and/or reproducing apparatus can be made inexpensive.

It is still another object of the present invention to provide a recording and/or reproducing method and associated apparatus which can be applied to another recording and/or reproducing apparatus with compatibility.

It is a further object of the present invention to provide a recording and/or reproducing method and associated apparatus which is suitable as a tape cassette recorder utilizing a so-called compact cassette.

In accordance with a first aspect of this invention, a recording method includes the steps of separating a single monaural audio signal into at least first and second monaural audio signals which are the same in phase, mixing the first monaural signal with a clock signal having an amplitude level substantially lower than the amplitude of the monaural audio signal and which has a frequency outside of an audio band, mixing the second monaural audio signal with a data signal whose amplitude level is substantially lower than that of the monaural audio signal and which is formed of a frequency outside of an audio band and which is opposite in phase to the clock signal, and recording the first monaural audio signal mixed with the clock signal and the second monaural audio signal mixed with the data signal on a record medium.

As a second aspect, a reproducing method and associated apparatus includes the steps of reproducing the recorded first monaural audio signal mixed with the clock signal and the second monaural audio signal mixed with the data signal from two channels of a record medium by the magnetic head formed of the first and second channel heads, reproducing the single monaural audio signal by adding the first and second monaural audio signals, separating the first monaural audio signal to reproduce the clock signal and separating the second monaural audio signal to reproduce the data signal.

As a third aspect, a recording apparatus comprises a separator for separating a single monaural audio signal into at least first and second monaural audio signals which are the same in phase with each other, a first mixer for mixing the first monaural audio signal with a clock signal whose amplitude level is substantially lower than that of the monaural audio signal and which has a frequency outside of the audio band, a second mixer for mixing the second monaural audio signal with a data signal whose amplitude level is substantially lower than the monaural audio signal and having a frequency outside of the audio band and the phase of which is opposite to that of the clock signal, and a magnetic head formed of first and second channel heads for recording the first monaural audio signal mixed with the clock signal by the first mixer and the second monaural audio signal mixed with the data signal by the second mixer on two channels of the record medium.

As a fourth aspect, a reproducing apparatus comprises a magnetic head formed of first and second channel heads for reproducing the recorded first monaural audio signal mixed with a clock signal and the recorded second monaural audio signal mixed with a data signal from the two channels of the record medium, an adder for adding the first and second monaural audio signals to reproduce a single monaural audio signal, a first separator for separating the first monaural audio signal to reproduce the clock signal, and a second separator for separating the first monaural audio signal to reproduce the data signal.

BRIEF DESCRIPTION OF THE DRAWINGS

The following detailed description, given by way of example, and not intended to limit the present invention solely thereto, will best be understood in conjunction with the accompanying drawings in which:

FIGS. 2A to 2E are waveform diagrams to which reference will be made in explaining the operation of the recording apparatus of FIG. 1;

FIG. 3 is a block diagram showing a circuit arrangement of a reproducing apparatus, and to which a reproducing method and associated apparatus of this invention can be advantageously applied; and FIGS. 4A to 4E are waveform diagrams to which reference will be made in explaining the operation of the reproducing apparatus of FIG. 3.

DETAILED DESCRIPTION OF A PREFERRED EMBODIMENT

Figure 1:
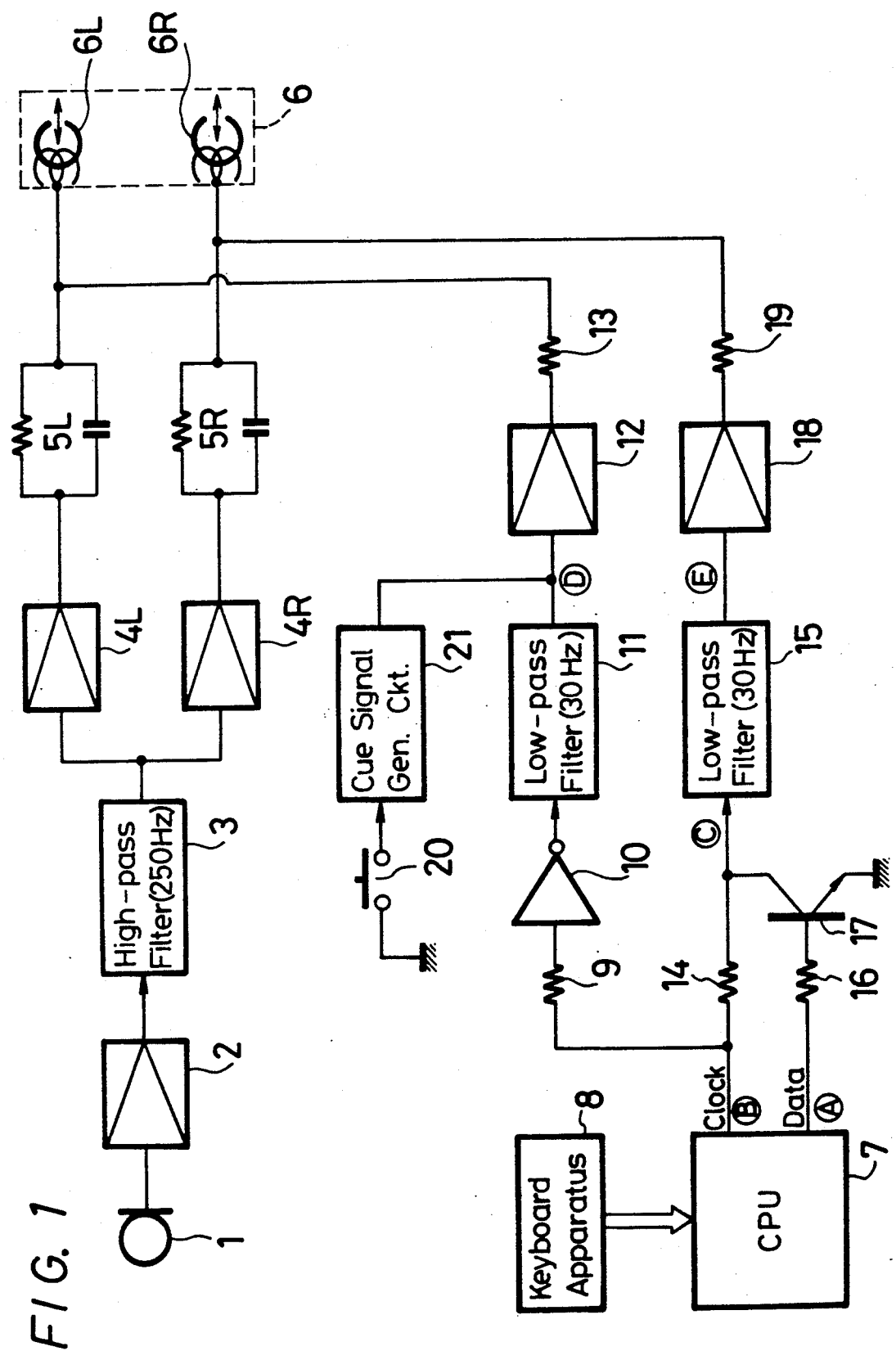
FIG. 1 is a block diagram showing a circuit arrangement of a recording apparatus, and to which a recording method and associated apparatus of the present invention can be advantageously applied.

A recording and/or reproducing method according to an embodiment of the present invention will now be described with reference to the drawings. The apparatus of FIG. 1 is particularly adapted for use as a portable type tape recorder in which the recording method of this invention is employed.

It will be seen in FIG. 1 that an audio signal from a microphone 1 is supplied through an audio amplifier 2 to a high-pass filter 3 whose cut-off frequency is more than 250 kHz, wherein one band portion (low band) of the audio signal is removed. The thus filtered single audio signal is separated to provide monaural audio signals of two channels. The two-channel monaural audio signals are respectively supplied through separate drive amplifiers 4L, 4R and separate parallel circuits 5L, 5R, each being formed of a resistor and a capacitor, to two channel heads 6L, 6R of a stereo head 6, in phase. The head 6 records the two channel monaural audio signals on a magnetic tape (not shown).

A central processing unit (CPU) 7 forms a data signal and so on. The CPU 7 is driven by an internal bit clock having a frequency, for example, of 32 kHz. The CPU 7 forms a data signal by encoding data indicative of time and date on the basis of an incorporated clock block (not shown) or data such as place and memorandum inputted by a keyboard 8 or the like in accordance with a predetermined digital coding method.

The CPU 7 generates a clock signal corresponding to the above-mentioned bit clock and this clock signal is supplied through a resistor 9 to an invertor 10, in which it is phase-inverted. The phase-inverted clock signal is supplied through a low-pass filter 11 having a cut-off frequency of less than 30 kHz, a gain control amplifier 12 for adjusting the amplitude level of the signal and a resistor 13, all connected in series to a junction between the parallel circuit 5L and the first channel head 6L of the stereo head 6.

The clock signal from the CPU 7 is also supplied through a resistor 14 to the input of a low-pass filter 15 having a cut-off frequency of less than 30 Hz. The data signal from the CPU 7 is supplied through a resistor 16 to the base of an NPN transistor 17. The collector of the transistor 17 is connected to a junction between the resistor 14 and the input of a low-pass filter 15 and the emitter of transistor 17 is grounded.

The signal from the low-pass filter 15 is supplied through a gain control amplifier 18, for adjusting the amplitude level of the signal and a resistor 19 to a junction between the parallel circuit 5R and the second channel head 6R of the stereo head 6.

When a cue operation switch 20 is manually turned ON or OFF, a cue signal generator circuit 21 generates a cue signal having a low frequency which is fed to the input of the amplifier 12.

Referring to FIGS. 2A-2E, when the CPU 7 generates the data signal shown in FIG. 2A and a clock signal shown in FIG. 2B, these output signals from the CPU 7 are mixed by the transistor 17 to produce an output signal shown in FIG. 2C. Note that the nodes of the circuit in FIG. 1 are labeled with letters corresponding to the wave forms shown in the FIGS. 2a-2c, respectively, etc. The clock signal is phase-inverted by the invertor 10 and is fed to the low-pass filter 11, whereby it is filtered-out to provide a signal having a waveform approximated to a sine wave as shown in FIG. 2D. Further, the output signal from the transistor 17 is supplied to the low-pass filter 15, from which there is derived a signal having a waveform whose pulse portion is approximated to a sine wave as shown in FIG. 2E. These output signals shown in FIGS. 2D and 2E are opposite to each other in phase and the amplitude levels of these output signals are attenuated by the filtering characteristics of the low-pass filters 11 and 15, respectively.

The signals 2D and 2E are level-adjusted to have a low amplitude level, for example, of about -15 dB by the gain control amplifiers 12, 18 and the resistors 13, 19, respectively, as compared with the audio signals supplied to the first and second channel heads 6L and 6R forming the stereo head 6, and then mixed to the monaural audio signals, respectively.

The audio signal, the clock signal and the data signal are recorded on the magnetic tape as set out above.

A reproducing method of this invention will now be described with reference to FIG. 3 and FIGS. 4A to 4E. FIG. 3 shows a circuit arrangement of a reproducing apparatus to which the present invention can be applied.

In FIG. 3, it will be seen that two channel monaural signals, reproduced from the magnetic tape (not shown) by two channel head 31L, 31R of a stereo head 31 are supplied to separate head amplifiers 32L, 32R, respectively. The output terminals of these amplifiers 32L, 32R are separately coupled through resistors 33L and 33R, respectively, to the base of an NPN transistor 34. The transistor 34 produces at its collector an output signal in which two channel monaural signals including the audio data and the data signal are mixed. The output signal of the transistor 34 is supplied through a volume control 35 and an amplifier 36 to a loudspeaker 37 and is thereby delivered as a sound.

The output signal from the amplifier 32L is also supplied through a resistor 38 to the input of a low-pass filter 39 having a cut-off frequency of less than 1 kHz. The output signal from the low-pass filter 39 is supplied through an amplifier 40 to the input of a low-pass filter 41 having a cut-off frequency, for example, of less than 30 Hz. The output signal from the low-pass filter 41 is supplied through an amplifier 42 to a comparator 43 whose output signal is supplied to a CPU 44 as a clock signal.

The output signal from the amplifier 32R is also supplied through a resistor 45 to the input of a low-pass filter 46 having a cut-off frequency of less than 30 Hz. The output signal of the low-pass filter 46 is supplied through an amplifier 47 to a comparator 48. The output signal from the comparator 48 is supplied to the CPU 44 as a data signal. The output signal of the CPU 44 is supplied to a display 49.

A signal from the amplifier 40 is also supplied to a cue signal detecting circuit 50, from which a drive control signal is supplied to a motor 51 which drives a magnetic tape (not shown) or the like when a cue signal is detected.

FIGS. 4A-4E depict the waveforms at the correspondingly labeled nodes in FIG. 3. Thus, when the portion of the recording medium on which the audio signal, the clock signal and the data signal are recorded is reproduced by the tape recorder, the first and second channel heads 31L, 31R of stereo head 31 derive two-channel monaural signals in which the signal waveforms shown in FIG. 4A and 4B are added together. When these signals (before attenuation by resistors 33L and 33R, respectively) are added together, the equi-phase audio signals (not shown) are caused to double in amplitude. However, the oppositely phased mixed data signal and clock signal are outputted as a signal in which, as shown in FIG. 4C, the data portions "1" are opposite in phase and cancel each other out, thus leaving only the data portion of "0".

When the above-noted signal is supplied to the loudspeaker 37, the speaker 37 emanates sound with a sufficient amplitude level that the listener can listen to the thus reproduced excellent sound without a jarring sound from the data and clock signals because the mixed signal of the data and clock signal of −15 dB much lower in amplitude level than the equi-phase audio signals and the mixed data and clock signal has a low frequency of less than 30 Hz so that it can not noticeably affect the reproduced sound even if it is reproduced.

The signals from the amplifiers 32L and 32R are also respectively supplied to the low-pass filters 41 and 46, from which there are derived a data signal component and a clock signal component only, respectively. These signals are respectively supplied to the comparators 43 and 48 which generate the pulse signals shown in FIGS. 4D and 4E, respectively. These signals are supplied to the CPU 44 from which there is read-out a data value as shown in the bottom of FIG. 4. On the basis of the thus obtained data value, the display 49 displays on a display screen thereof characters and pictures indicative of date, place and so on. The audio signal and the data signal are reproduced as set out above.

When the magnetic tape thus recorded by the above mentioned recording method is reproduced by an existing reproducing apparatus, the reproduced signal is substantially the same as the above-mentioned added signal so that excellent sound, having only a very small influence from the mixed signal, can be listened to. If the reproducing apparatus utilizes a stereo head, the data and the clock signals having opposite phases are decreased by a cancelling effect of the listener's ear, whereby the relative amplitude of the equi-phase audio signals are effectively increased, thereby making it possible for the listener to listen to good sound.

As described above, according to the recording and/or reproducing apparatus of the present invention, two channel monaural audio signals are recorded in equi-phase and the clock signal and the data signal are recorded opposite in phase, whereby the clock signal and the data signal in the resultant added audio signal cancel each other out, providing good sound to listen to. Further, the clock signal and the data signal are satisfactorily obtained from the two channel audio signals, whereby the data signal can be recorded by the simplified circuit arrangement. Simultaneously, compatibility with other recording and/or reproducing apparatus can be maintained.

Further, the recording and/or reproducing method of this invention can be applied to a street-wear type cassette tape recorder or the like. In that case, the cassette tape recorder is provided with a thin-type, liquid crystal display and a keyboard. The keyboard is attached to a lid openable and closable at a cassette insertion portion thereby to input and display desired characters and the like by scrolling displayed data on the display screen of the liquid crystal display. For example, data such as the year, month, day of the week and time and data of about 5 characters are inputted by the keyboard and data of 150 bits including so-called checksum are repeatedly recorded at an interval of 7 seconds.

Furthermore, the microphone 1, which is the audio signal input terminal in FIG. 1, can be a line input terminal to which there is supplied an input signal from the outside. In addition, the speaker 37, which is the output terminal in FIG. 3, can be a headphone output terminal.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

We claim as our invention:

1. A recording method comprising the steps of: separating a single monaural audio signal into at least first and second monaural audio signals which are the same in phase;

mixing the first monaural signal with a clock signal having an amplitude level substantially lower than that of the monaural audio signal and which has a frequency outside of the audio band;

mixing the second monaural audio signal with a data signal whose amplitude level is substantially lower than that of the monaural audio signal and which is formed of a frequency outside of the audio band and which is opposite in phase to the clock signal; and recording the first monaural audio signal mixed with the clock signal and the second monaural audio signal mixed with the data signal on a record medium by a magnetic head formed of first and second channel heads.

2. The recording method according to claim 1, wherein the data signal is formed of data representing time, place, memorandum or the like in the form of characters and figures or the like.

3. The recording method according to claim 1, further comprising the step of generating the clock signal and the data signal by a central processing unit (CPU).

4. The recording method according to claim 1, further comprising the steps of mixing the first monaural audio signal with a cue signal having a low frequency for controlling an operation of the record medium and recording the mixed signal on the record medium.

5. The recording method according to claim 4, further comprising the steps of mixing the cue signal with the clock signal and the first monaural audio signal and recording a resultant mixed signal on the record medium.

6. A reproducing method comprising the steps of:
reproducing a recorded first monaural audio signal mixed with a clock signal and a recorded second monaural audio signal mixed with a data signal from two channels of a record medium;
reproducing a single monaural audio signal by adding the first and second monaural audio signals together;
separating the clock signal from the reproduced first monaural audio signal; and
separating data signal from the reproduced second monaural audio signal.

7. The reproducing method according to claim 6, wherein the data signal is formed of data which represents time, place, memorandum or the like in the form of characters, figures or the like.

8. The reproducing method according to claim 7, further comprising the steps of receiving the clock signal and the data signal and visually displaying the time, place, memorandum or the like represented by the data.

9. The reproducing method according to claim 6, further comprising the step of separating from the first monaural audio signal a cue signal having a low frequency for controlling an operation of the record medium.

10. The reproducing method according to claim 9, further comprising the steps of separating the cue signal and the clock signal from the first monaural audio signal and separating the clock signal and the cue signal from each other.

11. A recording apparatus comprising:
separating means for separating a single monaural audio signal into at least first and second monaural audio signals which are the same in phase with each other;
clock signal generating means for generating a clock signal whose amplitude level is substantially lower than that of the monaural audio signal and which has a frequency outside of the audio band;
first mixing means for mixing the first monaural audio signal with the clock signal;
data signal generating means for generating a data signal whose amplitude level is substantially lower than that of the monaural audio signal and having a frequency outside of the audio band and the phase of which is opposite to that of the clock signal;
second mixing means for mixing the second monaural audio signal with the data signal; and
magnetic head means formed of first and second channel heads for recording the first monaural audio signal mixed with the clock signal by the first mixing means and the second monaural audio signal mixed with the data signal by the second mixing means on two channels of the record medium, respectively.

12. The recording apparatus according to claim 11, wherein the data signal is formed of data which represent time, place, memorandum or the like in the form of characters, figures or the like.

13. The recording apparatus according to claim 11, wherein the clock signal generating means and the data signal generating means further comprise a central processing unit (CPU).

14. The recording apparatus according to claim 11, further comprising cue signal generating means for generating a cue signal having a low frequency for controlling an operation of the record medium and mixing means for mixing the first monaural audio signal with the cue signal.

15. The recording apparatus according to claim 14, wherein the third mixing means mixes the cue signal with the clock signal and mixes the resultant mixed signal with the first monaural audio signal.

16. A reproducing apparatus comprising:
magnetic head means formed of first and second channel heads for respectively reproducing a recorded first monaural audio signal mixed with a clock signal and a recorded second monaural audio signal mixed with a data signal from two channels of a record medium;
adding means for adding the first and second monaural audio signals together to reproduce a single monaural audio signal;
first separating means for separating the clock signal from the reproduced first monaural audio signal; and
second separating means for separating the data signal from the reproduced second monaural audio signal.

17. The reproducing apparatus according to claim 16, wherein the data signal is formed of data which express time, place, memorandum or the like in the form of characters, figures or the like.

18. The reproducing apparatus according to claim 16, further comprising a central processing unit (CPU) for receiving the clock signal and the data signal and display means connected to the CPU for visually displaying data such as time, place, memorandum or the like in the form of characters, figures or the like.

19. The reproducing apparatus according to claim 16, wherein the recorded first monaural signal is also mixed with a cue signal having a low frequency for controlling an operation of the record medium and further comprising third separating means for separating the cue signal from the reproduced first monaural audio signal.

20. The reproducing apparatus according to claim 19, wherein the third separating means separates the cue signal and the clock signal from the reproduced first monaural audio signal and separates the clock signal and the cue signal from each other.

21. The reproducing apparatus according to claim 16, wherein the data signal is formed of data which express time, place, memorandum or the like in the form of characters, figures or the like and further comprising a central processing unit (CPU) for receiving the clock signal and the data signal and display means connected to the CPU for visually displaying data such as time, place, memorandum or the like in the form of characters, figures or the like.

* * * * *